(12) United States Patent
McLeister et al.

(10) Patent No.: US 8,850,790 B2
(45) Date of Patent: Oct. 7, 2014

(54) GAS TURBINE ENGINE SPEED CONTROL SYSTEM AND METHOD DURING MAXIMUM FUEL FLOW

(75) Inventors: Larry McLeister, Phoenix, AZ (US); Kevin Moeckly, Chandler, AZ (US); Ammon Hancock, Laveen, AZ (US)

(73) Assignee: Honeywell International Inc., Morristown, NJ (US)

(*) Notice: Subject to any disclaimer, the term of this patent is extended or adjusted under 35 U.S.C. 154(b) by 703 days.

(21) Appl. No.: 13/189,252

(22) Filed: Jul. 22, 2011

(65) Prior Publication Data
US 2013/0019606 A1    Jan. 24, 2013

(51) Int. Cl.
F02C 7/057 (2006.01)
F02C 9/54 (2006.01)

(52) U.S. Cl.
CPC .................................. F02C 9/54 (2013.01)
USPC ...................... 60/39.27; 60/39.23; 60/793

(58) Field of Classification Search
CPC ........................................................ F02C 9/54
USPC ........... 60/39.23, 39.27, 39.281, 39.282, 773, 60/793
See application file for complete search history.

(56) References Cited

U.S. PATENT DOCUMENTS

| | | | |
|---|---|---|---|
| 4,809,497 A * | 3/1989 | Schuh | 60/39.27 |
| 6,164,057 A | 12/2000 | Rowen et al. | |
| 6,551,068 B2 | 4/2003 | Blotenberg | |
| 6,758,044 B2 | 7/2004 | Mannarino | |
| 7,076,940 B2 * | 7/2006 | Hirayama et al. | 60/39.27 |
| 7,140,188 B2 | 11/2006 | Hosokawa et al. | |
| 7,245,040 B2 | 7/2007 | Mukavetz et al. | |
| 7,269,953 B2 | 9/2007 | Gadde et al. | |
| 7,422,414 B2 | 9/2008 | Fujii et al. | |
| 7,712,299 B2 | 5/2010 | Wolflick et al. | |
| 8,499,541 B2 * | 8/2013 | Kawai et al. | 60/39.27 |
| 2009/0044513 A1 | 2/2009 | Fuller et al. | |
| 2010/0032964 A1 * | 2/2010 | Hoffmann et al. | 290/40 B |
| 2010/0162724 A1 | 7/2010 | Myers et al. | |
| 2011/0126547 A1 * | 6/2011 | Nanataki et al. | 60/773 |

* cited by examiner

*Primary Examiner* — Phutthiwat Wongwian
(74) *Attorney, Agent, or Firm* — Ingrassia Fisher & Lorenz P.C.

(57) ABSTRACT

Methods and apparatus are provided for selectively controlling the rotational speed of a gas turbine engine that drives a load compressor having movable inlet guide vanes and that is coupled to receive fuel at a fuel flow rate up to a maximum fuel flow rate. The rotational speed of the gas turbine engine, and the fuel flow rate to the gas turbine engine, are both sensed. If the sensed rotational speed of the gas turbine engine is less than a predetermined value and the sensed fuel flow rate to the gas turbine engine equals or exceeds the maximum fuel flow rate, the position of the inlet guide vanes is controlled to reduce load compressor mechanical load on the gas turbine engine.

16 Claims, 2 Drawing Sheets

GAS TURBINE ENGINE SPEED CONTROL SYSTEM AND METHOD DURING MAXIMUM FUEL FLOW

TECHNICAL FIELD

The present invention generally relates to gas turbine engine speed control and, more particularly, to a system and method for controlling gas turbine engine speed during maximum fuel flow to the gas turbine engine.

BACKGROUND

Gas turbine engines may be used to power various types of vehicles and systems. A typical gas turbine engine includes at least a compressor, a combustor, and a turbine, and may include additional components and systems, depending on the particular end-use of the gas turbine engine. During operation of a gas turbine engine, the compressor draws in, and raises the pressure of, ambient air to a relatively high level. The compressed air from the compressor is then directed into the combustor, where a ring of fuel nozzles injects a steady stream of fuel. The injected fuel is ignited, which significantly increases the energy of the compressed air. The high-energy compressed air from the combustor then flows into and through the turbine, causing rotationally mounted turbine blades to rotate.

A gas turbine engine may be used to supply propulsion power, electrical power, and/or pneumatic power. For example, many aircraft use gas turbine engines as auxiliary power units to supply pneumatic power for various systems and functions. These systems and functions may vary, and may include the aircraft environmental control system, the cabin pressure control system, and/or main engine start (MES) air. The pneumatic power is, in many instances, provided by bleeding compressed air from a centrifugal load compressor that is driven by the turbine.

More specifically, during gas turbine engine operation, the load compressor draws in ambient air, via an air inlet, and compresses the air. A plurality of inlet guide vanes are mounted adjacent the inlet and are movable via one or more actuators. By selectively adjusting the position of the inlet guide vanes the flow rate of air entering the load compressor, and thus the flow rate of bleed air supplied to the various systems and functions, may be regulated.

The above-described gas turbines may, under certain operating scenarios, experience maximum operating conditions due to a limit of available fuel flow rate. This can occur, for example, if the mechanical load on the turbine is too high while the fuel flow rate to the gas turbine engine is at a maximum. When a limited fuel delivery condition occurs, the turbine speed will begin to drop below the commanded speed. If the turbine speed drops too low, then gas turbine operation may be compromised.

Hence there is a need for a system and method that will reduce the mechanical load on the turbine relatively quickly when a limited fuel delivery condition occurs so that the speed of the turbine may quickly recover. The present invention addresses at least this need.

BRIEF SUMMARY

In one embodiment, a method of selectively controlling the rotational speed of a gas turbine engine that drives a load compressor having movable inlet guide vanes, for a gas turbine engine that coupled to receive fuel at a fuel flow rate up to a maximum fuel flow rate, includes sensing the rotational speed of the gas turbine engine, sensing the fuel flow rate to the gas turbine engine, and controlling a position of the inlet guide vanes to reduce load compressor mechanical load on the gas turbine engine when the sensed rotational speed of the gas turbine engine is less than a predetermined value and the sensed fuel flow rate to the gas turbine engine equals or exceeds the maximum fuel flow rate.

In another embodiment, a compressor inlet guide vane control system includes a gas turbine engine, a load compressor, a rotational speed sensor, a fuel flow sensor, and a control. The gas turbine engine is for receiving fuel at a fuel flow rate up to a maximum fuel flow rate. The load compressor is coupled to, and mechanically loads, the gas turbine engine. The load compressor includes a plurality of movable inlet guide vanes. The rotational speed sensor is configured to sense gas turbine engine rotational speed and supply a rotational speed signal representative thereof. The fuel flow sensor is configured to sense fuel flow rate to the gas turbine engine and supply a fuel flow rate signal representative thereof. The control is coupled to receive the rotational speed signal and the fuel flow rate signal, and is configured, upon receipt of the rotational speed signal and the fuel flow rate signal, to control inlet guide vane position to reduce load compressor load on the gas turbine engine when the gas turbine engine rotational speed is less than a predetermined value and the fuel flow rate equals or exceeds the maximum fuel flow rate.

Furthermore, other desirable features and characteristics of the gas turbine engine speed control system and method will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description. In this regard, although the inlet guide vane actuation and control system and method are described as being implemented in a gas turbine engine load compressor, and most notably a load compressor of an auxiliary power unit, it will be appreciated that the system and method may also be implemented in various other gas turbine engines and components thereof that include inlet guide vanes. Moreover, while control logic configurations are, for clarity and ease of description, depicted and described herein using discrete logic representations, it will be appreciated that the control logic may be implemented in hardware, software, firmware, or various combinations thereof.

Figure 1:
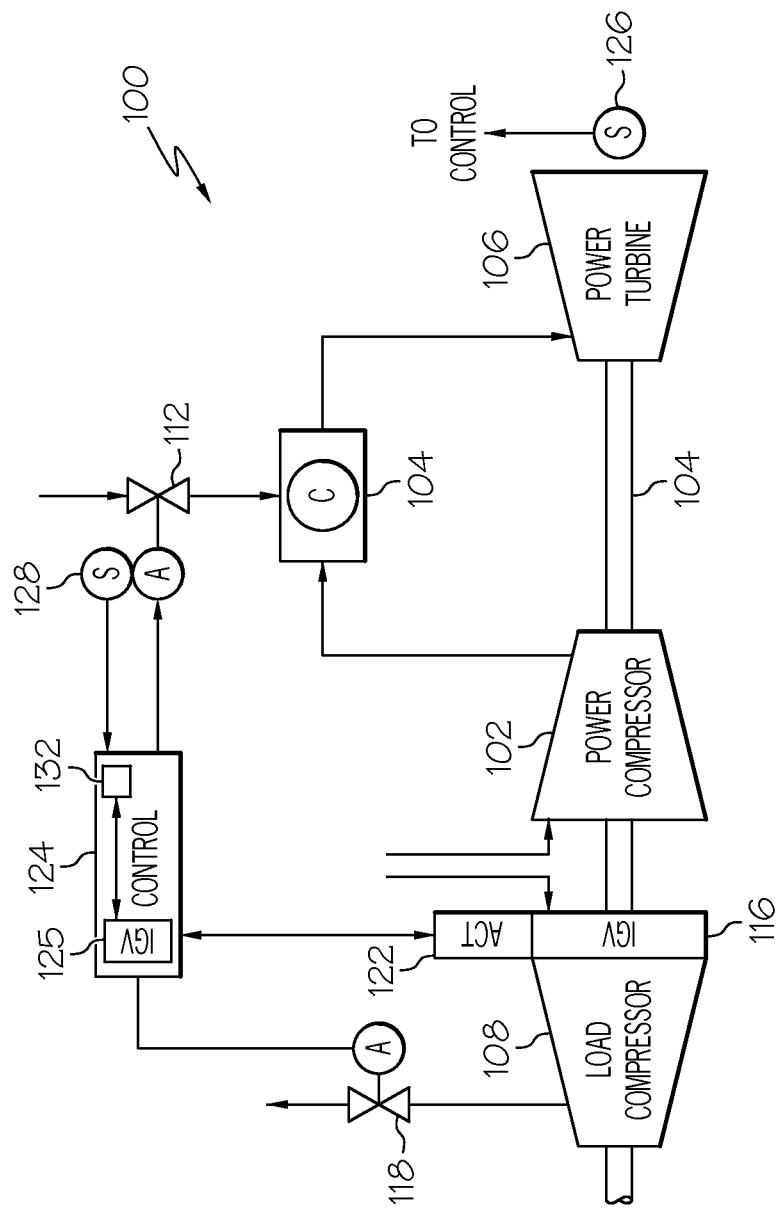
FIG. 1 is a schematic representation of an embodiment of an exemplary auxiliary power unit (APU) that may implement the present invention.

Turning now to FIG. 1, an embodiment of an exemplary auxiliary power unit (APU) 100 is shown in simplified schematic form. The APU 100 includes a power compressor 102, a combustor 104, a power turbine 106, and a load compressor 108. During operation of the APU 100, the power compressor 102 draws ambient air into an inlet, compresses the air, and supplies the compressed air to the combustor 104. It will be appreciated that the compressor 102 may be implemented using any one of numerous types of compressors now known or developed in the future. For example, the power compressor 102 may be a single-stage or multi-stage centrifugal compressor.

The combustor 104 receives the compressed air from the power compressor 102, and also receives a flow of fuel from a non-illustrated fuel source via a fuel metering valve 112. The fuel and compressed air are mixed within the combustor 104, and are ignited to produce relatively high-energy combustion gas. The combustor 104 may be implemented as any one of numerous types of combustors now known or developed in the future. Non-limiting examples of presently known combustors include various can-type combustors, various reverse-flow combustors, various through-flow combustors, and various slinger combustors.

No matter the particular combustor configuration 104 used, the relatively high-energy combustion gas that is generated in the combustor 104 is supplied to the power turbine 106. As the high-energy combustion gas expands through the power turbine 106, it impinges on the turbine blades (not shown in FIG. 1), which causes the turbine 106 to rotate. It will be appreciated that the turbine 106 may be implemented using any one of numerous types of turbines now known or developed in the future including, for example, a vaned radial turbine, a vaneless radial turbine, and a vaned axial turbine. No matter the particular type of turbine that is used, the power turbine 106 includes an output shaft 114 that drives the power compressor 102 and the load compressor 108. Though not depicted, it will be appreciated that the power turbine 106, via the output shaft 114, may also drive a generator, a starter-generator, and/or an accessory gear box.

The load compressor 108, as just noted, is driven by the power turbine 106 via the output shaft 114. When driven, the load compressor 108 draws ambient air into an inlet, via a plurality of inlet guide vanes 116, and compresses the air. The compressed air may be supplied to various pneumatic loads via a bleed air valve 118. For clarity, the pneumatic loads are not depicted in FIG. 1, but may include, for example, an environmental control system and main engine starting air for one or more main engines. It will additionally be appreciated that the load compressor 108 may be implemented using any one of numerous types of compressors now known or developed in the future. For example, the load compressor 108 may be a single-stage or multi-stage centrifugal compressor.

As noted above, ambient air is drawn into the load compressor 108 via a plurality of inlet guide vanes 116. The inlet guide vanes 116 are disposed adjacent the inlet of the load compressor 108 and are movable, via one or more inlet guide vane actuators 122, to a plurality of positions. As is generally known, air flow into and through the load compressor 108 may be regulated by adjusting the position of the inlet guide vanes 116. The inlet guide vane actuators 122, and thus the positions of the inlet guide vanes 116, are controlled via inlet guide vane control logic 125 that, at least in the depicted embodiment, is disposed within a control 124, an embodiment of which will now be briefly described.

The control 124 is configured to control the overall operation of the engine 100. More specifically, at least in the depicted embodiment, the control 124 implements fuel control logic to control fuel flow rate to the combustor 104 by, among other things, controlling the position of the fuel metering valve 112. The control 124 also implements suitable control logic to control the inlet guide vane actuation logic to control the positions of the inlet guide vanes 116. A detailed description of the fuel control logic is not needed to fully describe or enable the claimed invention, and will therefore not be provided. However, a portion of the inlet guide vane actuation logic 125 and the functionality implemented thereby will now be described in more detail.

Figure 2:
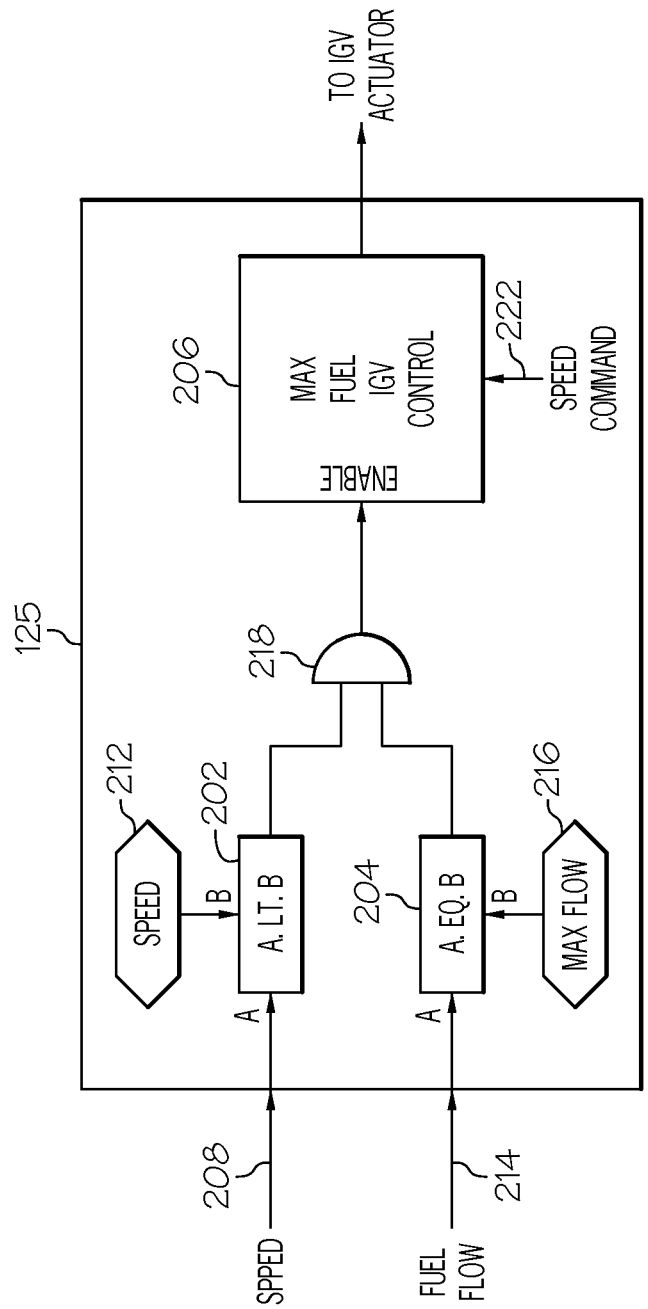
FIG. 2 is a functional block diagram of an exemplary embodiment of a portion of inlet guide vane actuation control logic that may be implemented in the APU of FIG. 1

With reference now to FIG. 2, a functional schematic representation of one embodiment of at least a portion the inlet guide vane actuation logic 125 is depicted. Although the configuration and implementation of the portion the inlet guide vane actuation logic 125 that implements the functionality described herein may vary, the depicted portion includes a first comparator 202, a second comparator 204, and a maximum fuel inlet guide vane control 206. The first comparator 202 is coupled to receive a rotational speed signal 208 representative of the rotational speed of the gas turbine engine (e.g., the power turbine 106). The first comparator 202 is configured to compare the sensed rotational speed signal 208 to a predetermined speed value 212 (e.g., SPEED), and supplies a binary output based on this comparison. In particular, at least in the depicted embodiment, the first comparator 202 supplies a "logical-1" if the sensed rotational speed 208 is less than the predetermined speed value 212, and supplies a logical-0" if the sensed rotational speed 208 is not less than the predetermined speed value 212. It will be appreciated that the particular value that is used for the predetermined speed value 212 may vary, but is preferably set to a value equal to a certain percentage of maximum operational speed. For example, in one particular embodiment, the predetermined speed value 212 is 98% of maximum operational speed.

The second comparator 204 is coupled to receive a fuel flow signal 214 representative of the fuel flow rate to the gas turbine engine (e.g., to the combustor 104). The second comparator 204 is configured to compare the fuel flow signal 208 to a predetermined flow value 216 (e.g., MAX_FUEL), and supplies a binary output based on this comparison. In particular, at least in the depicted embodiment, the second comparator 204 supplies a "logical-1" if the sensed fuel flow 214 is equal to the predetermined flow value 216, and supplies a logical-0" if the sensed fuel flow 214 is not equal to the predetermined flow value 216. It will be appreciated that the particular value that is used for the predetermined flow value 216 may vary, but it is preferably set to a value equal to 98% of the maximum fuel flow rate that is controllably deliverable to the gas turbine engine 100.

Before proceeding further, it is noted that the rotational speed signal 208 and the fuel flow signal 214 may be supplied from any one of numerous sources. In the depicted embodiment, however, the rotational speed signal 208 is supplied from a rotational speed sensor 126 (see FIG. 1) that is configured to sense the rotational speed of the gas turbine engine 100, and supply the rotational speed signal 208 to the first comparator 202. It will be appreciated that the rotational speed sensor 126 may be implemented using any one of numerous types of sensors. The fuel flow signal 214 is supplied from a sensor 128 (see FIG. 1) that is configured to sense fuel flow to the gas turbine engine 100 either directly or indirectly. That is, the sensor 128 may be implemented using, for example, a flow rate sensor to directly sense the fuel flow rate to the gas turbine engine 100. Alternatively, the sensor 128 could be implemented using, for example, a position sensor to indirectly sense the position of, and thus base fuel flow rate on, the position of a flow control valve, such as the fuel metering valve 112 or the calculated fuel flow based on fuel demand output signal to 112.

Returning to a description of the inlet guide vane actuation logic 125, it is seen that the outputs of the first and second comparators 202, 204 are supplied to separate inputs of AND-logic 218. As is generally known, AND-logic will supply a "logical-1" only when all of its inputs are at a "logical-1," otherwise it supplies a "logical-0." Thus, the depicted AND-logic 218 will supply a "logical-1" only when both the sensed rotational speed 208 is less than the predetermined speed value 212 and the sensed fuel flow 214 is equal to the predetermined flow value 216. The output of the AND-logic 218 is coupled to an ENABLE input on the maximum fuel inlet guide vane control 206. It may thus be appreciated that the maximum fuel IGV (inlet guide vane) control 206 is enabled only when the output of the AND-logic 218 is a "logical-1," otherwise it is not enabled.

From the above description, the maximum fuel IGV (inlet guide vane) control 206 is enabled only when the sensed rotational speed 202 of the gas turbine engine is less than the predetermined speed value 212, and the sensed fuel flow rate 204 to the gas turbine engine is equal to or greater than the predetermined flow value 216. The maximum fuel inlet guide vane control 206 is configured, when it is enabled, to control the position of the inlet guide vanes 116 in a manner that reduces the mechanical load of the load compressor 108 on the power turbine 106. It may thus be appreciated that the maximum fuel IGV (inlet guide vane) control 206, when enabled, will move the inlet guide vanes 116 to a more closed position. In doing so, a turbine under-speed condition is prevented.

The maximum fuel IGV (inlet guide vane) control 206 may be configured, when enabled, to move the inlet guide vanes 116 to a fixed, predetermined position, or to selectively modulate the position of the inlet guide vanes 116. If configured to implement the latter functionality, and as FIG. 2 additionally depicts, the maximum fuel inlet guide vane control 206 may also be coupled to receive a speed command 222 that is representative of a commanded rotational speed of the gas turbine engine 100. The maximum fuel inlet guide vane control 206, in response to the speed command 222, will selectively modulate the position of the inlet guide vanes 116 to control the rotational speed of the gas turbine engine 100 to the commanded rotational speed.

The maximum fuel inlet guide vane control 206 may alternatively be configured, when enabled, to move the inlet guide vanes 116 to a fixed, predetermined position that will result in fuel flow to the gas turbine engine 100 dropping below the maximum fuel flow rate that is controllably deliverable to the gas turbine engine 100. As a result, fuel flow rate is once again used to control the speed of the gas turbine engine 100. Controlling gas turbine engine speed via fuel control is significantly more rapid than using inlet guide vanes to control speed.

The inlet guide vane actuation logic 125 may instead be configured to predict whether and when the gas turbine engine 100 will be in a condition where the gas turbine engine 100 will be commanding maximum fuel flow. If it is configured to implement this functionality, and as FIG. 1 additionally depicts, the control 124 may also include memory 132 having historical engine operational data stored thereon. The historical engine operational data may vary, but is at least a subset of engine operational data that was collected during previous engine runs. Some examples of the types of data that may be collected and stored in the memory include gas turbine efficiency, gas turbine performance, mechanical load-to-fuel demand ratio, load compressor efficiency, ambient pressure, and ambient temperature.

No matter the specific types of data that are stored in the memory 132, the inlet guide vane actuation logic 125 is coupled to selectively retrieve the historical engine operational data. The inlet guide vane actuation logic 125 is further configured to process the retrieved data to predict whether the sensed fuel flow rate to the gas turbine engine 100 will equal the maximum fuel flow rate simultaneous with the sensed rotational speed of the gas turbine engine 100 being less than the predetermined speed value 212. If the maximum inlet guide vane actuation logic 125 predicts that this condition will occur, it establishes a maximum position limit for the inlet guide vanes 116. The maximum position limit corresponds to the maximum inlet guide vane position that will prevent the sensed fuel flow rate to the gas turbine engine 100 from being equal to the maximum fuel flow rate 216 simultaneous with the sensed rotational speed of the gas turbine engine 100 being less than the predetermined speed value 212. As may be appreciated, with this latter embodiment, the logic devices depicted in FIG. 2 may not be implemented, if so desired.

The systems and methods described herein will reduce the mechanical load on a gas turbine engine 100 relatively quickly when a limited fuel delivery condition occurs, or is predicted to occur, so that the speed of the gas turbine engine may quickly recover or not droop.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of selectively controlling rotational speed of a gas turbine engine that drives a load compressor having movable inlet guide vanes, the gas turbine engine coupled to receive fuel at a fuel flow rate up to a maximum fuel flow rate, the method comprising the steps of:
   sensing the rotational speed of the gas turbine engine;
   sensing the fuel flow rate to the gas turbine engine; and
   controlling a position of the inlet guide vanes to reduce load compressor mechanical load on the gas turbine engine when (i) the sensed rotational speed of the gas turbine engine is less than a predetermined value and (ii) the sensed fuel flow rate to the gas turbine engine equals or exceeds the maximum fuel flow rate.

2. The method of claim 1, further comprising:
   receiving a speed command representative of a commanded rotational speed of the gas turbine engine; and
   selectively modulating the position of the inlet guide vanes to control the rotational speed of the gas turbine engine to the commanded rotational speed.

3. The method of claim 1, further comprising:
   moving the inlet guide vanes to a position that causes the sensed fuel flow rate to be less than the maximum fuel flow rate.

4. The method of claim 3, further comprising:
   receiving a speed command representative of a commanded rotational speed of the gas turbine engine; and controlling the fuel flow rate to the gas turbine engine to control the rotational speed of the gas turbine engine to the commanded rotational speed.

5. The method of claim 1, further comprising:
receiving historical engine operational data;
processing at least the historical engine operational data to predict whether the sensed fuel flow rate to the gas turbine engine will equal the maximum fuel flow rate simultaneous with the sensed rotational speed of the gas turbine engine being less than the predetermined value; and
establishing a maximum position limit for the inlet guide vanes that will prevent the sensed fuel flow rate to the gas turbine engine from being equal to the maximum fuel flow rate simultaneous with the sensed rotational speed of the gas turbine engine being less than the predetermined value.

6. The method of claim 1, wherein the step of sensing the fuel flow rate to the gas turbine engine comprises directly sensing fuel flow rate using a flow rate sensor.

7. The method of claim 1, wherein the step of sensing the fuel flow rate to the gas turbine engine comprises indirectly sensing fuel flow rate based on a position of a flow control valve.

8. A compressor inlet guide vane control system, comprising:
a gas turbine engine for receiving fuel at a fuel flow rate up to a maximum fuel flow rate;
a load compressor coupled to, and mechanically loading, the gas turbine engine, the load compressor including a plurality of movable inlet guide vanes;
a rotational speed sensor configured to sense gas turbine engine rotational speed and supply a rotational speed signal representative thereof;
a fuel flow sensor configured to sense fuel flow rate to the gas turbine engine and supply a fuel flow rate signal representative thereof; and
a control coupled to receive the rotational speed signal and the fuel flow rate signal, the control configured, upon receipt of the rotational speed signal and the fuel flow rate signal, to control inlet guide vane position to reduce load compressor load on the gas turbine engine when (i) the gas turbine engine rotational speed is less than a predetermined value and (ii) the fuel flow rate equals or exceeds the maximum fuel flow rate.

9. The system of claim 8, wherein:
the control is further coupled to receive a speed command representative of a commanded rotational speed of the gas turbine engine; and
the control is further configured to selectively modulate the position of the inlet guide vanes to control the rotational speed of the gas turbine engine to the commanded rotational speed.

10. The system of claim 8, wherein the control is further configured to move the inlet guide vanes to a position that causes the sensed fuel flow rate to be less than the maximum fuel flow rate.

11. The system of claim 10, wherein:
the control is further coupled to receive a speed command representative of a commanded rotational speed of the gas turbine engine; and
the control is further configured to control the fuel flow rate to the gas turbine engine to control the rotational speed of the gas turbine engine to the commanded rotational speed.

12. The system of claim 8, further comprising memory in operable communication with the control and having historical engine operational data stored therein,
wherein the control is further configured to:
selectively retrieve the historical engine operation data from the memory;
process at least the historical engine operational data to predict whether the sensed fuel flow rate to the gas turbine engine will equal the maximum fuel flow rate simultaneous with the sensed rotational speed of the gas turbine engine being less than the predetermined value; and
establish a maximum position limit for the inlet guide vanes that will prevent the sensed fuel flow rate to the gas turbine engine from being equal to the maximum fuel flow rate simultaneous with the sensed rotational speed of the gas turbine engine being less than the predetermined value.

13. The system of claim 8, wherein:
the control is further configured to supply position commands representative of a commanded inlet guide vane position; and
the system further comprises an inlet guide vane actuator coupled to the inlet guide vanes and coupled to receive the position commands, the inlet guide vane actuator configured, upon receipt of the position commands, to move the inlet guide vanes to the commanded inlet guide vane position.

14. The system of claim 8, wherein the fuel flow sensor is configured to directly sense the fuel flow rate to the gas turbine engine.

15. The system of claim 8, further comprising:
a fuel metering valve coupled to receive valve position commands from the control and configured, upon receipt of the valve position commands, to control the fuel flow rate to the gas turbine engine; and
a valve position sensor coupled to the fuel metering valve, the valve position sensor configured to sense a position of the fuel metering valve and supply valve position signals representative thereof.

16. The system of claim 15, wherein:
the fuel flow sensor is configured to indirectly sense the fuel flow rate to the gas turbine engine; and
the fuel flow sensor comprises the valve position sensor.

* * * * *